United States Patent
Schmer (10) Patent No.: US 12,007,365 B2
(45) Date of Patent: Jun. 11, 2024

(54) MONITORING SYSTEM FOR OPERATING AN ENERGY CHAIN

(71) Applicant: igus GmbH, Cologne (DE)

(72) Inventor: Konstantin Schmer, Cologne (DE)

(73) Assignee: IGUS GMBH, Cologne (DE)

( * ) Notice: Subject to any disclaimer, the term of this patent is extended or adjusted under 35 U.S.C. 154(b) by 773 days.

(21) Appl. No.: 17/048,859

(22) PCT Filed: Apr. 5, 2019

(86) PCT No.: PCT/EP2019/058662
§ 371 (c)(1),
(2) Date: Oct. 19, 2020

(87) PCT Pub. No.: WO2019/201626
PCT Pub. Date: Oct. 24, 2019

(65) Prior Publication Data
US 2021/0164872 A1    Jun. 3, 2021

(30) Foreign Application Priority Data
Apr. 20, 2018 (DE) ............ 20 2018 102 217.2

(51) Int. Cl.
*G01N 3/08* (2006.01)
*F16G 13/16* (2006.01)
(Continued)

(52) U.S. Cl.
CPC ............. *G01N 3/08* (2013.01); *F16G 13/16* (2013.01); *F16G 13/18* (2013.01); *G01L 5/103* (2013.01);
(Continued)

(58) Field of Classification Search
CPC .......... G01N 3/08; F16G 13/16; F16G 13/18; G01L 5/103; G01M 13/023; H02G 11/006; H02G 11/00
See application file for complete search history.

(56) References Cited

U.S. PATENT DOCUMENTS 9,372,138 B2 * 6/2016 Riddall ............... H02G 11/006
9,920,815 B2    3/2018 Jaeker et al.
(Continued)

FOREIGN PATENT DOCUMENTS

DE    20305479    6/2003
DE    20305619    8/2003
(Continued)

OTHER PUBLICATIONS

International Preliminary Report on Patentability from corresponding PCT Appln. No. PCT/EP2019/058662 dated Oct. 20, 2020.
(Continued)

*Primary Examiner* — Jonathan M Dunlap
(74) *Attorney, Agent, or Firm* — Grossman, Tucker, Perreault & Pfleger, PLLC (57) ABSTRACT

The invention relates to a monitoring system for an energy chain guiding at least one line between two connection points and comprising chain sections that are positionally variable relative to one another. The monitoring system comprises at least one strain relief device having a line holder coupled to the line; a carrier part on at least one of the connection points fixing the strain relief device in a stationary manner, by means of which the at least one line is fixed at the end side in a strain-relieving manner; and at least one measuring device which is arranged and configured to measure forces exerted on the fixed line during operation of the energy chain and/or which are transmitted by the at least one line in the direction towards the carrier part.

23 Claims, 5 Drawing Sheets

(51) Int. Cl.
*F16G 13/18* (2006.01)
*G01L 5/103* (2020.01)
*G01M 13/023* (2019.01)
*H02G 11/00* (2006.01)

(52) U.S. Cl.
CPC ........ *G01M 13/023* (2013.01); *H02G 11/006* (2013.01)

(56) References Cited

U.S. PATENT DOCUMENTS

| | | | |
|---|---|---|---|
| 2009/0320615 A1 | 12/2009 | Bechmann et al. | |
| 2015/0122047 A1 | 5/2015 | Riddall | |
| 2017/0231585 A1* | 8/2017 | Atzinger | A61B 6/4488 378/194 |
| 2019/0326740 A1 | 10/2019 | Hermey et al. | |
| 2020/0056947 A1 | 2/2020 | Habering et al. | |

FOREIGN PATENT DOCUMENTS

| | | | | |
|---|---|---|---|---|
| DE | 202009005647 U1 * | 7/2009 | ............ | F16G 13/16 |
| DE | 202014100540 | 6/2014 | | |
| DE | 102015003192 | 4/2016 | | |
| DE | 202016107316 | 3/2017 | | |
| DE | 202016107317 | 5/2017 | | |
| DE | 202017102410 | 9/2017 | | |
| DE | 102011011868 | 8/2018 | | |
| TW | 200835908 A | 9/2008 | | |
| WO | 2004/090375 | 10/2004 | | |
| WO | WO-2006066812 A1 * | 6/2006 | ............ | B66C 13/12 |
| WO | 2013/156607 | 10/2013 | | |
| WO | WO-2015118143 A1 * | 8/2015 | ............ | F16G 13/16 |

OTHER PUBLICATIONS

English translation of Office Action of Taiwan Patent Application No. 108112836, dated Jan. 5, 2023, 9 pages.

International Search Report from corresponding PCT Appln. No. PCT/EP2019/058662 dated Jun. 26, 2019.

Office Action from related Brazilian Patent Application No. BR112020021019-6, dated Apr. 14, 2023, but published Apr. 25, 2023. English translation of relevant sections attached.

\* cited by examiner

MONITORING SYSTEM FOR OPERATING AN ENERGY CHAIN

FIELD

The invention relates to a monitoring system for the operation of an energy chain.

BACKGROUND

Energy chains having lines guided in them are exposed to a variety of stresses, both with regard to the chain itself and with regard to the lines guided in it. On the one hand, this relates to wear of components of the energy chain, for example, joint regions of the chain links. Often the chain is arranged between the two connection points movable relative to one another with a formation of a deflection region, which connects, for example, an upper and lower strand of the chain. During chain displacement this deflection region moves along the chain. As a result, the lines guided in the energy chain are also subject to deformation when a certain line section is transferred during the chain displacement from a less curved, for example, linear state, to a more curved state, as present in the deflection region. The forward and backward movement of one of the connection points thus exerts alternating mechanical stresses on the line, in particular also bending stresses. Very high stresses thus arise in case of a fast chain displacement and a certain flexural rigidity of the lines. Furthermore, tensile and/or compression forces are exerted on the line, in the longitudinal direction thereof, during acceleration or deceleration of a chain end due to the displacement movement of the chain. These loads on the line can alone lead to wear of the line. However, differently constructed lines or lines having different cross-sections are also subject to different wear.

The alternating stresses exerted on the lines when the energy chain is displaced can also lead, under certain circumstances, to a certain slackening of the holding of the lines, in particular also at the strain relief of the respective line. These alternating stresses can also lead to the respective line undesirably changing its nominal position within the energy chain. The nominal position of the line is usually determined so that when the chain is displaced, line sections do not undesirably come into contact with other components such as e.g. the chain link inner sides, including with other lines. If the line changes position at least in a partial region in deviation from the nominal position, the line section can undesirably come into contact with another component of the chain, for example, one that defines the chain interior space, or with another line. However, such contact, in particular rubbing, bumping or hitting, can also lead to considerable wear of the line.

The wear of the line, in particular due to the chain displacement, however, requires maintenance of the lines at intervals to avoid failure of the same. A line failure would result in machine down time and line replacement and could also lead to damage to the machine supplied with the line, loss of fluids routed in a line through leakage into the environment, breakage of a line, damage to other lines or the chain, etc. On the other hand, such maintenance itself always also means undesirable machine downtime, which should be minimized when possible.

SUMMARY

It is therefore the object underlying the invention to provide a monitoring system for the operation of an energy chain with at least one line guided in it, through which the maintenance intervals for checking the state of the lines can be optimized and/or beginning damage to a line can be identified early without shutting down the energy chain.

This object is achieved by a monitoring system by the provision of a strain relief device for such a monitoring system.

According to the invention, at least one measuring device is provided for measuring forces which are exerted on the line to be fixed or on the fixed line during operation of the energy chain and/or which are transmitted during operation of the chain from the at least one line in the direction towards and/or into the carrier part. It has thus been found in the course of the invention that the forces transmitted during operation of the energy chain by the at least one line in the direction towards and/or into the carrier part (in general also: called "line forces") can be a measure of the wear of the line, in particular with otherwise same operating parameters of the chain; or wear can be concluded or at least suggested from line forces changing over a period of time with otherwise same operating parameters of the chain. Said period of time can represent a significant fraction of an otherwise usual maintenance interval, in which a significant wear of a line can thus already occur.

A monitoring device for an energy chain is already known from WO 2004/090375 A1. The wear of chain links and the articulated joints between them can be monitored by means of this. However, the wear of the chain or articulated joints of chain sections with one another does not correlate in any way with the wear of lines guided in the chain since other materials and other mechanical stresses are given. This applies in particular when cables of different construction types are guided in the chain. The line wear for a given chain displacement depends on the one hand on the type of line, but possibly also on the arrangement of the line within the chain, for example, whether the line is arranged near or distant from the line connecting the chain link joint elements. Also, the sensitivity of the lines for mechanical load peaks, for example, with rapid acceleration of the chain, can depend on the specific line structure. The monitoring device of WO 2004/090375 A1 thus does not solve the object underlying the invention.

For example, if a line (in general also: "lines") changes its position within the energy chain (in general also: "chain") in deviation from the nominal position for intended operation, this can cause a section of the line to strike another component such as a region of the chain link or a device thereof or against another line or to rub against the same. This can occur repeatedly, for example, at each displacement cycle, and thus lead to wear. A change in position of a line section from the nominal position can take place, for example, when the holder fixing the line slackens slightly or the line undesirably deforms with respect to its longitudinal extension, for example, i.e. laterally slips with a partial region in the chain link. This line section is spaced from the end region of the line in the longitudinal direction of the line, for example, arranged in the middle region of the line. In the course of the invention, it was found that the forces generated by this striking, rubbing or the like at the end region of this line are metrologically detectable and are transmitted from the line end region in the direction of the strain relief device of this line or on this strain relief device and beyond in the direction towards or onto the carrier part and are also metrologically detectable in this region of the force transmission or on these components. By measuring these line forces, an already beginning wear of the line can thus be detected early and, for example, countermeasures can be taken in good time, such as fixing the line in its nominal position. Alternatively, when there is no indication of incipient wear due to lack of deviation of the line forces from the expected line forces, the maintenance interval can be prolonged and thus machine downtime can be avoided. The "expected line forces" can be determined, for example, by a reference measurement with lines not impaired by wear or new lines. It is to be understood that the chain is operated in each case with the same operating parameters.

Furthermore, in the case of a long service life of the chain, the lines guided in the chain can be subject to operational aging, for example, a permanent elongation or stretching of the line. An associated reduction in cross-section can also affect the supply of the consumer connected to the chain lines. In the case of copper cables, for example, the copper core of the cable can thereby reduce its cross-section. As has been found in the course of the invention, this stretching can lead to a change in the force transmission of the line to the strain relief device (generally also "strain relief") with otherwise same operating conditions of the chain such as displacement speed, displacement acceleration, etc. Thus, due to the permanent elongation of the line, properties of the same change, which affect the transmission of forces upon the chain displacing from the line onto or in the direction towards the strain relief of the line and possibly beyond in the direction towards the carrier part, such as the flexural rigidity of the line without being bound by theory. If during displacement of the chain a section of the line which happens to be in the deflection region of the chain is thus bent, then forces acting in the longitudinal direction of the line, such as compression and/or tensile forces, are transmitted onto or in the direction towards the strain relief device. However, these forces change with changing mechanical properties of the line, such as its flexural rigidity, with otherwise the same operating parameters of the chain.

The same can apply when due to wear of a line section, other properties of the line change, which properties are important for the transmission of force by the line onto the strain relief or in the direction towards the strain relief or further in the direction towards the carrier part, such as e.g. the flexural rigidity of the line. Such a change can arise, for example, when (i) abrasion partially changes the wall thickness of a line sheath, (ii) individual layers of a line sheath detach from each another or their adhesion to each other changes due to repeated alternating mechanical stresses, (iii) individual layers of the line are subject to age-related change of their properties, such as changing their strength or stiffness; and/or (iv) the line changes its extension shape and plastically or permanently deforms with respect to its longitudinal extension, for example, spirally twists in the longitudinal direction of the line.

The aging of the line can thus be monitored based on the forces exerted upon or in the direction towards the strain relief or the carrier part. For example, tensile and/or compression forces but also, for example, torsional forces or other forces can be forces "in the direction towards" the strain relief or the carrier part. A maintenance or replacement of the line can take place when the age-related change and thus also the exerted line forces as a measured value exceeds a certain predefined threshold value. As a result, the maintenance intervals of the lines themselves can be optimized, for example, taking into account the stresses or operating times of the respective chain.

As a "carrier part" in the context of the invention is understood the component that fixes the strain relief device at the connection point in a stationary manner with respect to said connection point, for example, is screwed to this, and transmits forces from the strain relief in the connection point. When fixing the cables to the strain relief, the carrier part generally does not have to be changed in position relative to the environment or to the chain and/or to the lines. The carrier part can thus, for example, be a retaining rail for the strain relief and be fixed in a stationary manner to the ground, for example, screwed. For example, when there is an end fastening part having mutually opposite side plates, wherein the side plates are fixed to the ground in stationary manner, and a retaining rail for the strain relief is merely inserted in the side plates, the retaining rail is assigned to the strain relief.

In general, the strain relief can be fixed outside or also inside the energy chain, for example, at an end fastening part of the chain, wherein the end fastening part can be fixed in a stationary and a force-receiving manner at the connection point, for example, by screwing. If the strain relief is fixed at the end fastening part of the chain, the end fastening part can thus be understood as a carrier part in the context of the invention. For example, the strain relief can also be arranged outside the chain, for example, in the chain longitudinal direction behind the end fastening part of the chain. Optionally, a strain relief can also be arranged in a central region of the chain with respect to its longitudinal extent.

In the context of the invention, an "energy chain" is understood to mean any line guiding device having chain sections which are connected as alterable in length relative to each other, in particular articulated, wherein the individual chain links can be detachably or non-detachably fixed to each other. For example, the energy chain can be formed in one piece with the plurality of chain links. The chain provides a chain interior space in which the at least one line or a plurality of lines is guided. The chain interior space is preferably structurally delimited from the surroundings to guide the lines within the chain.

The chain is preferably arranged with the formation of an upper strand, lower strand and a deflecting region arranged between these, wherein the connection points are provided at the end regions of the upper and lower strand. The chain can also be arranged spirally wound and at least one of the connection points can be displaced about an axis of rotation. Other spatial arrangements of the chain and displacement paths thereof are also included in the invention.

Preferably, the measuring device is configured for measuring compression and/or tensile forces and/or torsional and/or bending forces, particularly preferably for measuring compression and/or tensile forces which are exerted on the line to be fixed or on the fixed line during operation of the energy chain and/or which are transmitted during operation of the chain by the at least one line in the direction towards and/or into the carrier part. However, the measuring device can also be configured to measure other forces which act on the line and/or are transmitted from it.

With regard to the force transmission direction from the line in the direction towards the carrier part, the at least one sensor of the measuring device can each couple directly to the line. In this case, with regard to the force transmission direction from the line in the direction towards the carrier part, the coupling of the sensor to the line can in particular couple in front of the strain relief, under certain circumstances also behind the strain relief. According to a preferred variant, the at least one sensor of the measuring device does not directly couple to the line, which can also apply to all sensors of the measuring device. The term "couple" with respect to the sensor is generally understood as a coupling to receive measured values for acquisition of the measured value.

In the context of the invention, the term "sensor" in each case also includes the arrangement of a plurality of sensors, unless the context indicates otherwise.

Particularly advantageously, the measuring device is arranged between the line and the carrier part with respect to a force flow direction from the at least one line to be fixed or the at least one line fixed on the strain relief device into the carrier part, in a manner effectively measuring the force. As a result, the forces transmitted during the chain displacement from the line on the strain relief device and from the latter further in the direction towards the carrier part and thus conveyed forces can be measured by means of the measuring device. In this case, the measuring device can couple in a measurement-effective manner to a component which is located directly in the force flow of the force transmission from the line, in particular the line region or line end region fixed to the strain relief via the strain relief in the direction of the carrier part or into the carrier part. However, "in the direction of the force flow" also includes components that are not directly located in the said force flow, but whose position or state, such as mechanical tension or torsion state, changes through the said force flow (or through its alteration). For measuring coupling, a respective sensor of the measuring device can be attached to said component or coupled to it in a force measuring manner. The force-measuring coupling of the measuring device includes the sensor being activated for measurement or being activatable for this purpose. According to one embodiment, the measuring device can be directly coupled to the line itself to measure force effectively, in particular before the strain relief of this line, as seen in the force transmission direction, so that forces acting on the line can be measured directly. Preferably, however, the measuring device does not directly couple to the line, which has the advantage that when replacing the line, the measuring device does not have to be decoupled from the line to be replaced and coupled to the new line.

It is understood that for the force measurement by the measuring device, the force acting on the respective component when the chain is displaced or force transmitted from the line in the direction towards the carrier part is measured directly or is measurable directly, or else a physical value which correlates with said force, can be measured. The force can be measured, for example, by a slight change in position of the respective component due to the forces transmitted by the line in the direction towards the carrier part, or also, for example, on the basis of stresses which are transmitted to the component by the forces exerted by the line, elastic deformations of the component such as bending or torsion thereof or the like. For example, the forces exerted by the line in the direction towards the carrier part can also be measured by a slight change in position of a component located in the force flow direction, which can be determined, for example, optically or by other measuring methods, by acceleration sensors or the like.

Preferably, the measuring device is formed as a force measuring device, that is, for example, in the form of a load cell, strain gauges, weigh cell, piezoelectric element, capacitive sensor, inductive sensor or the like, or including these as active measuring elements. Preferably, the measuring devices comprise at least one or more force sensors for acquisition of the respective measured value. The force measurement can be done as a direct or indirect force measurement. For example, physical values resulting from the force transmission, such as a shock or vibration of the corresponding component located in the direction of the force flow, can also be measured. When the measuring device is coupled to said component, which lies in the direction of the force flow between the line and the carrier part, the measuring device can generally be coupled to a reference part having an anchor point, when required, in order to measure the forces transmitted by the line to the component. The reference point can be a stationary anchor point arranged outside the chain. The force sensor of the measuring device can generally couple, on the one hand, to the respective component to which the line forces are transmitted and, on the other hand, to the anchor point in order to measure the line forces exerted on the component.

Particularly preferably, the measuring device is coupled to the strain relief in a force measuring manner in order to be able to measure the forces exerted by the line on the strain relief when the chain is displaced. This has on the one hand the advantage that when replacing the line, the measuring device does not have to be decoupled from the line and to be coupled to the new line, for example. On the other hand, the forces exerted by the lines when the chain is displaced are largely or practically completely absorbed by the strain relief of the respective line, so that the transmitted forces can be measured comparatively accurately and thus also changes of the force transmission due to appearance of wear of the lines or these effecting events, such as a striking of the line to a chain link, for example, in the region of the inner radius of the chain, in particular in the deflection region thereof. The "striking" can generally also occur through a corresponding contact. In this case, the measuring device can also be coupled to different regions of the strain relief device in a manner effectively measuring forces, for example, to measure relative force changes between these regions. The measuring device can also have a plurality of sensors, such as force sensors, which couple in a manner effectively measuring forces to stress-relieving holders provided for different lines, in order to measure the forces exerted by the line on the strain relief upon chain displacement. If a plurality of lines are provided, which are mounted on a strain relieve device in a strain-relieving manner, a single line or a smaller subgroup can be identified from the larger total number of lines fixed to the strain relieve device, which lines, due to wear, exert changing forces on the strain relief.

Particularly preferably, the measuring device can have at least one or more sensors which couple in each case to at least one or to exactly one line holder of the strain relief in a force measuring manner. The line holder is in this case that means of the strain relief, which cooperates directly with the line to relieve strain. The strain relief can, for example, be a clamping device, wherein the line holder can be designed as clamping means such as clamping jaws. By coupling the measuring device to the line holder, the forces exerted by the line on the strain relief can be measured particularly accurately, since they are transmitted by the line directly to the line holder. On the other hand, when the line is replaced, the coupling of the measuring device or the sensor to the line holder can be maintained, which substantially facilitates the maintenance of the chain and/or a line exchange. In addition, in particular, a plurality of sensors of the measuring devices can be coupled to a plurality of line holders in a force measuring manner, so that, in an arrangement of a plurality of lines in a chain, individual lines or subgroups of lines which are exposed to increased wear compared to other lines, can be more easily identified. Over a longer operational period of the chain with a plurality of displacing movements of the chain, the forces exerted by the lines on the strain relief or in the direction towards the carrier part change. This is advantageous because, in an arrangement of a plurality of lines in a chain, it is not immediately apparent through visual inspection during maintenance which of the lines is exposed to increased wear and the wear point on the line is not always easy to locate.

According to a further preferred embodiment, the strain relieve has a support region, by means of which the at least one line holder is fastened to the strain relief device, wherein the measuring device couples with the support region of the strain relief in a force measuring manner. Such a support region can be, for example, the bracket of a strap clamp to which a plurality of lines is fixed in a strain reliving manner. A strain relief of a chain often comprises a plurality of such support regions, wherein at a support region, a smaller subgroup of the total number of lines guided in the chain is relieved of strain. In this way, a subgroup of the lines can be identified, in which at least one or more lines is/are exposed to increased wear compared to lines of other subgroups, which are guided in the chain and fixed to the strain relief. Such a support region can, for example, also be a strain relief block of a strain relief, which comprises a plurality of such line holders for a plurality of lines. Such a support region can, for example, also be a holding block of a strain relief, which connects a plurality of strain relief blocks with each other.

The support region and the line holders of the strain relief device are preferably formed as separate components, so that, for example, lines of different diameters can be fixed to the strain relief by exchanging the line holders having different working cross-sections. If, for example, when the line holders are to be exchanged when retrofitting a chain to lines with another outer diameter or another line media, the support regions can optionally remain on the strain relief device and/or the sensors of the measuring device need not be decoupled from the support region. A retrofitting of the chain is thus much easier. Nevertheless, the support region is arranged, with respect to the force transmission of the lines in the direction towards the carrier element in the force flow direction, near the lines, so that the forces exerted by the lines and their changes over the service life of the chain are comparatively accurately measurable.

According to a further advantageous embodiment, the strain relief device has a base element, with which the strain relief is held at the carrier part and is fixed to the carrier part. The measuring device is preferably coupled to the base element in a force measuring manner Such a base element can, for example, be the foot of a strain relief, for example, the foot of a strap clamp formed as a strain relief, with which this is held on the carrier part in a tensile force or traction measuring manner, for example, a retaining rail thereof. The base element can, for example, also be formed as a bar or block, which fixes the strain relief on the carrier part, for example, by screwing. The base element is in this case usually arranged outside of the line-guiding overall cross-section of the chain. In the arrangement of one or more lines in the chain and thus also on the strain relief device, the coupling of the measuring device to the base element is thus not hindered by the lines, in particular also when replacing the lines. Furthermore, a checking of the intended force-measuring coupling of the measuring device on the base element is facilitated, since it is not affected or disturbed by the plurality of lines.

The support element and/or base element, to which the sensor of the measuring device in each case according to the invention couples, can be a separate component of the strain relief or formed in one piece with another element thereof. In particular, support region and base region can be formed in one piece with one another.

It is understood that the individual exemplary embodiments with force-transmitting coupling of the measuring device to the individual elements or regions of the strain relief such as line holders and/or support region and/or base region can be realized in combination with each other.

If the measuring device comprises a plurality of sensors for measuring according to the invention, which are coupled to different components, for example, to a plurality of parts of the strain relief, then these sensors can be attached prepositioned on a sensor holding device. The sensor holding device can be positioned in the region of the chain, for example, on the strain relief, in order to metrologically couple the sensors to the desired components for force measurement. The installation of the sensors is thus considerably facilitated.

According to a particularly preferred modification, the measuring device comprises two or more sensors, such as force sensors, which couple in measured-value receiving manner with different regions of one and the same component onto which line forces are transmitted, for measuring relative differences in forces between the two said regions of the same component. Instead of the component, a component group can also be present, wherein the individual components of this group are preferably fixed to each other in a force transmitting manner, particularly preferred unchanging in position relative to each other. For this purpose, for example, strain gauges or other measurement sensors, in particular force sensors, can be coupled to different regions of a component such as a support region and/or a base region of the strain relief device and/or the line itself. As a result, relative differences in the forces acting on both said regions can be determined by means of the measuring device. As a result, for example, an elastic deformation of the component such as a bend and/or a torsion due to the line forces can be measured. As a result, valuable information can be obtained to monitor the stress on the line, which can be essential for determining the maintenance interval.

According to another particularly preferred embodiment, the measuring device has a plurality of sensors such as force sensors, which couple to different components in a measured value acquisition manner, which are arranged, as seen in the transmission direction of the line forces in the direction towards the carrier part, between the line or the line end fixed in the region of the strain relief and the carrier part, for example, at different line end regions, and/or various components of the strain relief and/or the carrier part. In particular, this coupling of the plurality of sensors can refer to different components of the strain relief, which serve the strain relief of different lines, so for example, different line holders e and/or different support elements and/or different base elements for fixing various lines. As a result, it can be detected, for example, that certain lines or line subgroups are exposed to other loads such as alternating stresses than other lines or line subgroups as a result of the chain displacement. As a result, valuable information can be determined for monitoring the lines, in particular when these line forces of different lines or line subgroups change relative to each other.

In each case, a respective strain relief device is preferably provided at both connection points of the energy chain, which relieves the at least one line to-be-fixed with regard to tensile forces acting on the line when the energy chain is displaced. Measuring devices according to the invention can be provided at one or both of the connection points. As a result, in particular, forces exerted on a movable connection point and/or on a stationary connection point by the lines in the direction towards the carrier part can be detected separately by means of the measuring device arranged at the connection point, optionally at both. Since the introduction of force into the chain and thus also into the lines takes place at the movable connection point as a result of its displacement, different alternating stresses can act on the lines at both connection points. The line monitoring can thereby be made more efficient or more sensitive in certain applications.

The monitoring system preferably has an evaluation unit in order to store the measured values of the sensors acquired by means of the measuring device and/or to evaluate them with regard to a possible or given wear of the lines.

The evaluation unit can be configured to determine, for example, deviations of the actual values of the determined measured values or of values derived therefrom from predetermined nominal values, taking into account predetermined tolerances. The derived values can be derived from the measured values, for example, based on a given physical and/or mathematical dependency. Thus, for example, a measured force can be converted into a pressure taking into account a predetermined surface. The nominal values with tolerances can be set to ensure proper operation of the lines over a particular period of time, such as a timed maintenance interval.

The evaluation unit can be configured to determine, for example, temporal changes of the actual values or of values derived therefrom over a period of time, which can lie within the maintenance interval, for example, after each or after a predetermined number of displacement cycles of the chain. Changes in the operating condition of the lines can thus be detected. This can be extrapolated to reaching the tolerance limit over time and the remaining operating time of the line up to a required maintenance can be estimated.

Preferably, the evaluation unit is connected in a signal-transmitting manner to a signal device which transmits a monitoring signal or interference signal to a monitoring person. Thus, in the event of deviations of the actual values of the line forces from the nominal values or in the event of temporal change of the actual values beyond a predetermined threshold value, an interference signal can be emitted by means of the signal device, which indicates, for example, a maintenance requirement or stops the relative movement of the connection points relative to one another.

The evaluation unit can also store further operating parameters of the chain, which are preferably present in the same displacement cycle of the chain or at the same time as the detection of the forces acting on the line or transmitted by the line in the direction towards the carrier part. These operating parameters of the chain can be measured by other suitable measuring devices. Such operating parameters can be, for example, the displacement speed of the chain or the acceleration of the chain during the displacing movement, in particular also the maximum displacement speed of the chain or the maximum acceleration of the chain in the displacement cycle of the force measurement according to the invention. Maximum loads are usually exerted on the lines of the chain at maximum acceleration of the chain. These further operating parameters of the chain can be displayed together with the determined measured values of the forces exerted by the lines (line forces) according to the invention and/or used to evaluate the line forces. Thus, for example, correlations of the measured values of the line forces with the further operating parameters can be carried out, for example, by known mathematical evaluation methods or algorithms Thus, for example, measured values of the line forces can be used separately for evaluation when selected operating parameters of the chain, such as those mentioned above, exceed a specific threshold value or lie in predefined ranges.

During operation of the chain, at least one of the connecting elements thereof is usually moved in a reciprocating movement between maximum positions which define a displacement cycle of the chain and thus also of the lines guided by it. This can be given, for example, in the arrangement of the chain with upper strand, lower strand and these connecting deflection region of the chain, wherein the connection point of the upper strand performs this reciprocating motion.

Depending on the consumer, which is supplied with media and/or energy by the lines guided in the chain, different displacing movements of the connection points to one another are given. Thus, according to one variant, the different displacement cycles of the chain can always be the same, that is, the same time-dependent profiles of the chain displacement speed and chain acceleration can be given, which is understood here as "uniform operation of the chain". This can be the case when the consumer is an automatedly-operated machine, for example, a machine of an industrial manufacturing process. For such cases with always at least substantially identical recurring chain displacement cycles, it is usually and mostly sufficient to measure only the forces transmitted by the respective line in the direction towards the carrier element according to the invention by means of the measuring device, to determine the forces exerted by the respective line in the direction towards the carrier element and their deviation from a nominal value or temporal changes of these line forces. It is understood that for the sake of completeness, the chain operating parameters can also be acquired and displayed and/or stored in the evaluation device, together with or related to the line forces of the respective displacement cycle.

On the other hand, according to another variant, the different displacement cycles of the chain can differ significantly from each other, thus having different time-dependent profiles of the chain displacement speed and/or chain acceleration and/or different displacement paths of the connection points, including different maximum distances of the connection points to each other in different displacement cycles. This is understood herein as "uneven operation of the chain". This can be the case when the consumer is displaced with connection point manually, for example, in a manually controlled crane system. It is understood that then with respect to different displacement cycles, due to the uneven chain displacement cycles, temporally uneven line forces are exerted in the direction of the strain relief and/or the carrier part.

The developments described below are particularly preferred in uneven chain operation. According to a variant, at the beginning of the maintenance interval, the chain is displaced with a predefined displacement cycle, that is, with a defined displacement path of the at least one movable connection point, speeds of the chain movement defined over the displacement path and defined accelerations. The line forces are measured and stored as a reference value by the evaluation unit during this displacement cycle (reference cycle). The reference cycle can also be any selected displacement cycle. After a predetermined number of displacement cycles, which is substantially less than the total number of displacement cycles to be expected within the maintenance interval, a reference displacement of the chain can be performed again and the actual values then measured by the measuring device can be compared with the reference value taking into account predetermined tolerances. Different line forces are exerted at significantly different displacement cycles of the chain, so that by the procedure described, changes or aging of the lines can be compared with the reference value and the different modes of operation of the chain in relation to the evaluation of the measurement results of the line forces can be easily eliminated. The reference measurements can be made, for example, after a predefined number of chain displacement cycles.

According to another variant in uneven chain operation, a reference measurement of the line forces can take place with predefined displacement of the chain, as described in the first variant, or any displacement cycle can be selected as a reference measurement. During the further displacement cycles, the essential displacement parameters of the chain, such as length and/or direction of displacement, speeds of chain displacement during a displacement cycle, in particular the maximum speed, chain acceleration or maximum chain acceleration during a displacement cycle, etc., can then be measured and stored in the evaluation unit. It is understood that these values can be determined at each displacement cycle or only on a part of the displacement cycles, preferably at fixed intervals. To determine any wear of the lines, which is apparent or manifested by changing line forces, then, for example, the measurement of the line forces of different displacement cycles can be compared with each other, in which the chain performs an at least substantially similar displacing movement, thus, for example, predetermined movement parameters of the chain differ only in a predetermined tolerance range, that is, for example, deviations of the maximum speed and/or maximum acceleration of the chain movement in the displacement cycle differ by less than 10% or less than 5% from the corresponding parameters of the reference cycle. It is understood that in this case a plurality of predetermined reference cycles can also be carried out, which are each defined in relation to the displacement parameters of the chain, but significantly differ in essential operating parameters of the chain, such as maximum chain speed and/or maximum chain acceleration etc. In this way, several reference cycles can be defined, which can be arranged distributed over the range of different modes of operation of the chain.

A further variant of the monitoring system is that the evaluation unit is configured such as to computationally compare different displacement cycles of the chain with the reference cycle. For example, it can be expected that when the maximum acceleration of the chain is doubled, the line forces will increase, for example, by a factor of four. The operating parameters of the chain determined with a certain movement of the chain can hereby be converted according to the reference values by a predetermined algorithm. The algorithm can be based on assumptions of how the line forces change with changes in an operating parameter, or these dependencies can be determined experimentally, in which the chain is displaced at different operating parameters, the line forces are measured and a mathematical compensation calculation takes place to determine the physical dependencies of the changing operating parameters on changing line forces.

Furthermore, the invention relates to a strain relief device for one or more lines guided in an energy chain, comprising a line holder for fixing at least one line to relieve strain and at least one sensor such as force sensor, which is coupled or can be coupled to a partial region or a component of the strain relief device and which is a part of a measuring device for measuring the line forces, thus the forces which are exerted on the line to be fixed or on the fixed line during operation of the energy chain and/or which are transmitted during operation of the chain by the at least one line in the direction towards the carrier part. Preferably, the measuring device or at least the at least one sensor is also part of the thus further developed strain relief device. The further developed strain relief device according to the invention is configured and provided to be used in a monitoring system according to the invention.

Said force sensor or sensor can be coupled or be configured for coupling to the line holder of the strain relief device. The force sensor or sensor can be coupled to the coupling at a support region and/or base region of the strain relief device or be configured for coupling to this. It is understood that the different variants can also be provided in combination with each other. In general, the force sensor or sensor can be coupled to a region of the strain relief device which is arranged between the line holder and the fastening region of the strain relief device for fixing the same to the carrier part. It is understood that the "coupling" of the force sensor or sensor to the strain relief device or the respectively described region thereof represents a measured-value-receiving coupling with respect to the line forces.

Also included in the invention is a method for monitoring the operation of an energy chain, in particular for monitoring at least one line guided in an energy chain during operation of the chain, using the monitoring system according to the invention. Preferably, the monitoring system comprises an evaluation device and/or a signal device. Reference is fully made to the further remarks on the subject according to the invention and the operation of the chain and their monitoring.

BRIEF DESCRIPTION OF THE DRAWINGS

The invention is explained by way of example with reference to exemplary embodiments. All features of the exemplary embodiments are independently or in combination with each other also generally within the scope of the invention—that is independent of the respective embodiment—disclosed. Shown are in.

DETAILED DESCRIPTION

Figure 1:
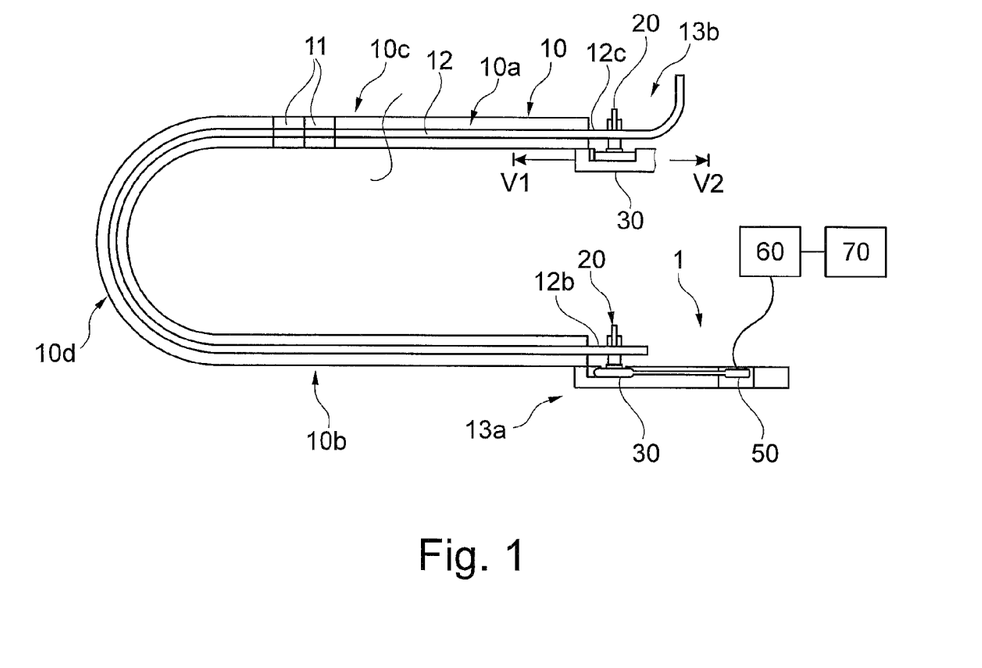
FIG. 1 is a schematic representation of an energy chain having a monitoring device.

FIG. 1 shows a schematic representation of a monitoring system 1 for the operation of an energy chain 10, wherein the chain guides at least one or more lines 12 such as in the form of cables, hoses or the like between two connection points 13a, 13b relatively movable with respect to one another. The line transfers media and/or energy from one connection point to the other, or from a supply device to a consumer. The lines are in this case arranged in a chain interior space 10a. The energy chain comprises a plurality of chain links 11 connected to each other in an articulated manner, which change their position relative to each other during the displacing movement of the chain. The chain can also be formed in another form of a line guide device with mutually position-changing sections, such as, for example, a hose, joint tube or the like. One of the connection points, here the connection point 13a, is formed as a stationary connection point or fixed point, the connection point 13b can represent an entrainment member of a moved machine part or the like, wherein both connection points 13a, 13b can also be formed to be movable. In general, the chain can be arranged to form a lower strand 10b, an upper strand 10c and a deflection region 10d connecting them, wherein the lower strand and/or upper strand can be rectilinear but also arcuate with respect to their direction of extension. However, the chain can also be spatially arranged and/or displaced in a different way.

The movable connection point 13b is displaceable between the displacement end points V1 and V2, which are defined, for example, by the displacing movement of the machine part coupled thereto. The displacement end points V1 and V2 thus define the maximum displacement path of the chain during its operation, for example, over the duration of a maintenance interval. The movement of the movable connection point 13b from the first displacement end point V1 to the second displacement end point V2 and back to the first displacement end point V1 defines a displacement cycle of the chain. The displacement end point V1, V2 can be defined here by the position of the connection points or another predefined point of the chain in the chain longitudinal direction, for example, by the position of the end fastening part which fixes the chain at the connection point, the position of the strain relief 20 at said chain end or the like. The displacement end point V1 and/or V2 can optionally occupy a different spatial position in the space receiving the chain such as a machine hall at each displacement cycle of the chain.

When the chain is displaced between the displacement end points V1 and V2, the chain is to be accelerated to a maximum speed starting from the displacement end points V1, V2, in which the chain is at rest, so that the chain experiences a maximum speed and a maximum acceleration in the displacement cycle.

Due to the displacing movement of the chain, forces are exerted also onto the at least one line 12 guided in the chain (hereinafter also referred to as: "lines"), in particular forces in the longitudinal direction of the line such as tensile and/or compression forces. Furthermore, line sections are subjected to alternating bending stresses when they are within the deflection region running along the chain or leave this during chain displacement. This leads to alternating loads of the lines 12. The forces exerted on the respective line are transmitted to the strain relief 20 via the line end regions 12b, 12c, with which the line is fixed on a strain relief 20 in a strain relieving manner, transmitted onto the strain relief 20 and from this in the direction towards or onto a carrier part 30. The strain relief 20 has a line holder 21, which cooperates directly with the line 12 to relieve strain, for example, in the form of a clamping connection. The strain relief 20 is in this case fixed to the carrier part 30 in order to be able to convey the forces exerted by the line on the strain relief during the chain displacement into the carrier part. The conveyance of the forces from the fixed line end region 12b, 12c onto the strain relief 20 and further in the direction towards or into the carrier part 30 is to be understood here as the force flow direction KF from the line in the direction towards the carrier part 30. Here, for example, the regions 20a of the strain relief 20, which are arranged facing away from the carrier part 30 with respect to the line 12, are also to be understood as "in the direction of the force flow KF" from the line end region 12b towards the carrier part 30, which lie between the line and carrier part.

Due to the force exerted on the lines 12 during the displacing movement of the chain 10, the lines 12 are subject to wear, which can require an exchange of the line 12 to ensure safe operation of the machine supplied via the lines 12. Such wear can occur when the lines 12 change their nominal position during continuous operation of the chain, to a striking or rubbing of the respective line on another component, such as another line, the inner wall of a chain link or a device arranged in this such as a chain link interior division or the like. Wear of the line 12 can also occur due to the constant alternating loads on the line during displacement of the chain, which wear can already manifest itself in a certain permanent strain or compression or other permanent deformation or change in cross-section of the line.

With the monitoring system 1 according to the invention, the state or a wear-related impairment of the line 12 due to the displacement of the chain can be monitored, in particular also independent of any wear of parts of the energy chain such as wear of the articulated joints between the individual chain links.

For monitoring the mechanical loads and/or any wear of the line 12, a measuring device 50 is provided, which is arranged and configured to measure forces which act on the line 12 during operation of the chain 10 and/or are transmitted by the line 12 in the direction towards the carrier part 30. For this purpose, the measuring device 50 can metrologically couple to components which are transmitted in the direction of the force flow from the end region 12b of the line via the strain relief 20 in the direction towards the carrier part 30 or into the carrier part 30 which holds and fixes the strain relief 20. As a result, the forces transmitted during operation of the chain from the line 12 in the direction towards the carrier part 30 can be detected by means of the measuring device 50. Undesired loads on the line can be measured based on changing forces which are transmitted by the line end region 12b to the strain relief 20 and further in the direction of the carrier part 30 or into the carrier part 30 (hereinafter referred to as "line forces"). These forces can, for example, represent an increased force transmission of the line to the strain relief, for example, when the line strikes against another component during displacement of the chain. On the other hand, a reduction in the line forces during operation of the chain can occur as well, for example, when the line, due to the alternating stresses, experiences a weakening such as a permanent strain or material fatigue, which can lead to a lower flexural rigidity of the line. The permanent elongation of the copper core of an electrical cable is cited as an example here.

According to the exemplary embodiment, the invention is explained with reference to the formation of a connection point 13a. It is also understood that only the other connection point 13b or in particular both connection points 13a, 13b can be formed according to the invention.

According to the exemplary embodiment, the measuring device 50 is formed as a force measuring device in the narrower sense, so that forces are thus measured as a physical value by means of at least one or more sensors 51, which forces are transmitted by the line 12 in the force flow direction KF in the direction towards or onto the carrier part 30. However, in a modification, the measuring device 50 can also be formed by means of suitable sensors 51 for measuring physical values, which result from the exertion of force from the line 12 on the strain relief 20 and optionally further in the direction of and/or into the carrier part 30, for example, changes in position of a region of the strain relief 20, which are, for example, also optically detectable, or the like. The type of force measurement of the line forces is not limited to certain physical measurement principles, so, for example, power boxes, extensometers or the like can be used. However, particularly preferred are load cells, strain gauges and/or piezo elements, depending on the magnitude of the forces to be measured as well as their temporal changes and the measurement accuracy. The term "sensor" can respectively be a single sensor or a plurality of sensors.

The measuring device 50 is coupled in a force measuring manner in the region of the force transmission of a force flow KF, is from the at least one line 12 to-be-fixed or fixed on the strain relief 20 in the direction of the carrier part 30. This means that the sensor 51 of the measuring device, such as a force sensor, is arranged in the region of the force transmission of said force flow KF in order to detect the forces acting here. The sensor 51 of the measuring device can in particular be located directly in the force flow or, optionally, also be coupled in a force measuring manner to a component such as the strain relief region 20a, which lies not directly in the force flow KF but is subjected to force by the said force flow KF and in doing so, for example, changes its position by means of the forces transmitted by the force flow or experiences strains or stresses due to the force flow or its changes, in particular during displacement of the chain, which can be detected by the sensor 51 of the measuring device 50.

In a particular embodiment, the measuring device 50 is coupled with the strain relief device 20 in the force measuring manner or configured for coupling to it. For this purpose, the sensor 51 of the measuring device 50 can be coupled to the strain relief 20 to measure force or be configured for coupling to it.

Figure 2:
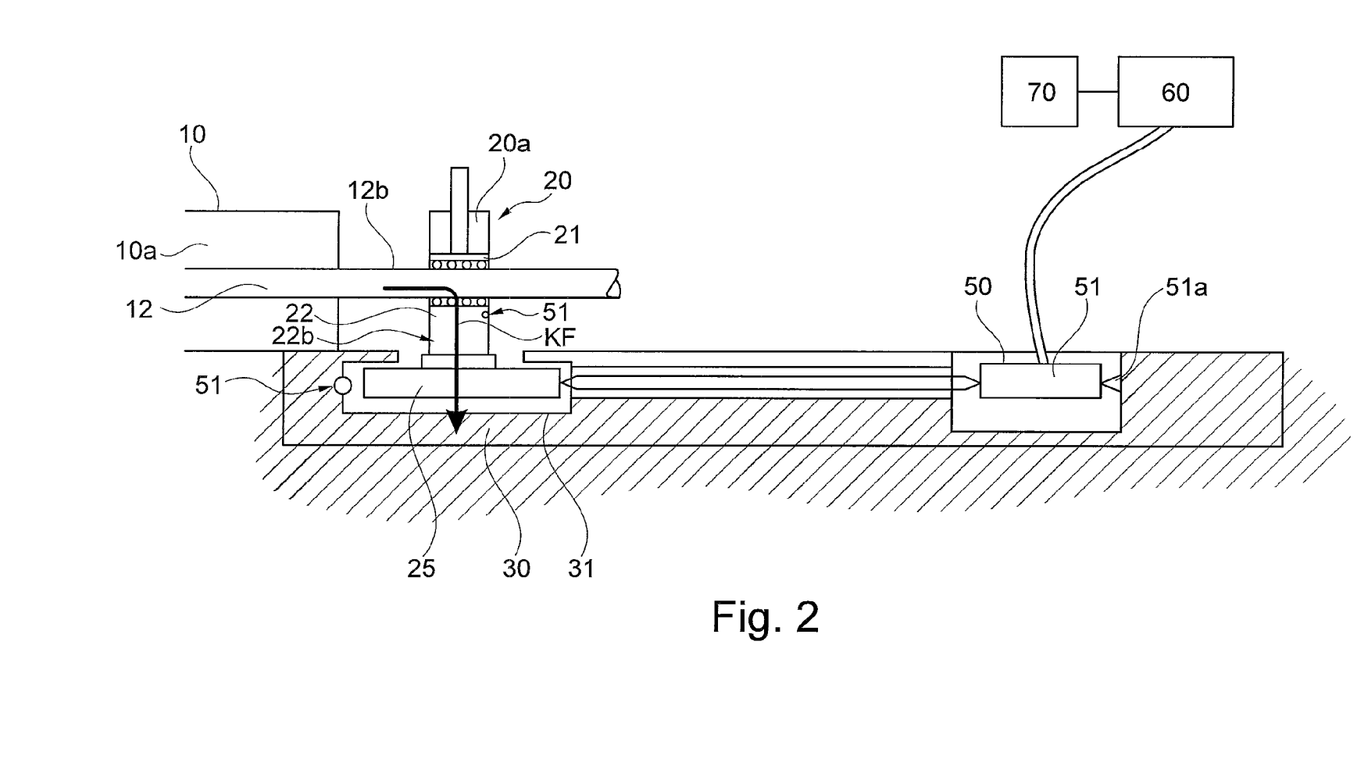
FIG. 2 is a detailed view according to FIG. 1.

According to FIG. 2, the sensor 51 is coupled in the force measuring manner to a base element 25 of the strain relief 20. The base element 25 is formed as one piece with the strain relief 20 or can be formed as a separate component of the strain relief 20. For example, the base element 25 can constitute the foot of a strap clamp used as a strain relief, with which the strain relief 20 fixes to a fastening region 31 of the carrier part 30, which can be formed as a support rail to be able to convey the line forces via the strain relief 20 into the carrier part 30.

According to one embodiment, the measuring device 50 is coupled in a force measuring manner with at least one line holder 21 of the strain relief 20 or configured to be coupled thereto (see FIGS. 2 to 4), wherein the line holder 21 cooperates directly with the respective line 12 in a tensile force absorbing manner. The line holder 21 can in this case be formed, for example, as a clamping jaw, which is fixed on the line in a clamping manner.

According to one embodiment, the strain relief 20 has a support region 22 (see FIGS. 2 to 4) which supports or holds the line holder 21 and connects it directly or optionally via further components of the strain relief 20 to the base element 25 of the strain relief and conveys the forces transmitted from the line end region to the line holder to the carrier part. The support region can be provided to a support element, which is formed as a separate component with respect to the line holder. For supporting the line holder, the support region 22 is not limited to specific spatial orientations relative to the line holder 21 or to the base element 25. The support region can thus be arranged, for example, laterally and/or above and/or below the line holder with respect to the vertical and/or horizontal direction of a Cartesian space coordinate system of the space in which the monitoring system with the energy chain is arranged. The vertical direction in this case corresponds to the direction of gravity. The support region 22 is formed here, for example, as a leg of a strap clamp, wherein the strap clamp can have a plurality of superposed line holders 21 for holding a plurality of lines one above the other. In this case, the sensor 51 of the measuring device can be arranged on the region 22a of the support region facing the carrier part 30 or else on the region 22b of the support region 22 facing away from the carrier part 30 with respect to the line 12 or also on both regions 22a, 22b. Values derived from the measured values determined at the regions 22a, 22b, such as, for example, difference values, can also be determined here through an evaluation device 60 connected to the measuring device 50. The sensor 51, for example, as a load cell, in this case couples, on the one hand, to the component on which the acting force is to be measured and, on the other hand, to a fixed anchor point 51a as the reference point. This principle can apply independently of the embodiment.

Figure 3:
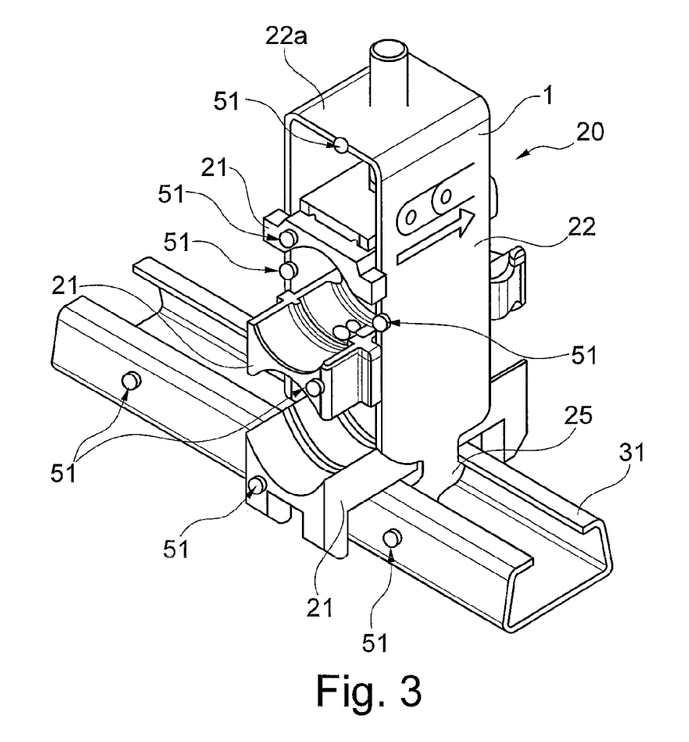
FIG. 3 is a schematic representation of a strain relief of a first embodiment with sensors of the measuring device coupled thereto.
Figure 4:
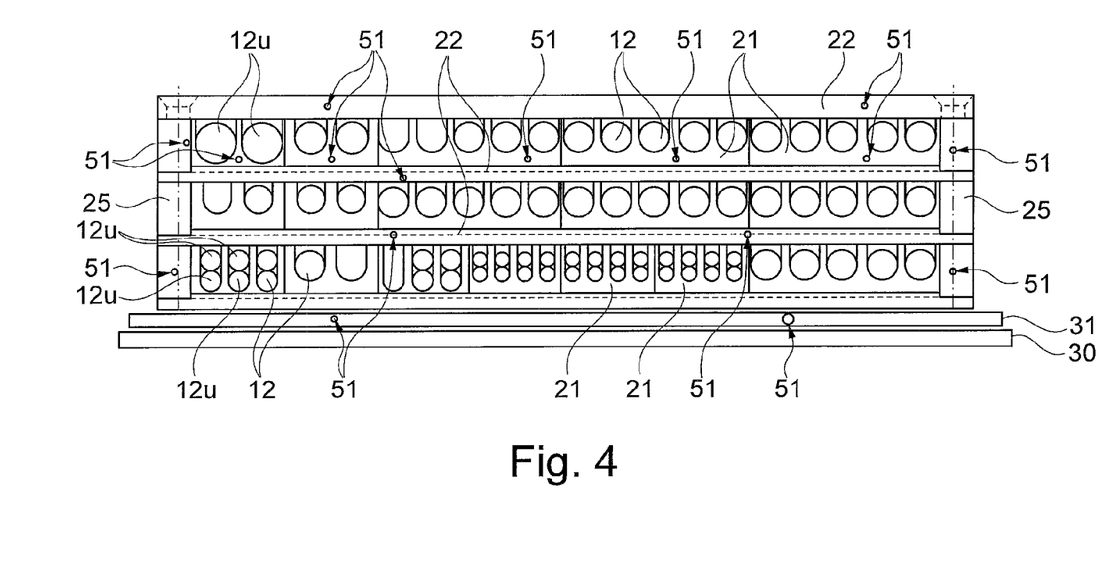
FIG. 4 is a schematic representation of a strain relief of a second embodiment with sensors of the measuring device coupled thereto.

As shown in FIGS. 3 and 4, the strain relief 20 can also be formed for fixing of a plurality of lines 12 in a strain relieving manner. The strain relief can in this case have a plurality of line holders 21, which respectively hold individual lines 12 or subgroups 12U of lines 12 with respect to the larger total number of the lines fixed to the strain relief 20. In this case, separate sensors 51 of the measuring device 50 can be coupled to a plurality of separate line holders 21 in a measurement transmitting manner in order to measure forces acting on the various line holders 21 or physical values derived from these forces. The corresponding measured values transmitted by the measuring device 50 to the evaluation device 60 can then be displayed individually or processed in relation to each other, for example, by subtraction or the like. This makes it possible, for example, to monitor individual lines or subgroups of lines autonomously and independently of other lines of the strain relief.

Optionally, the measuring device 50 can also be coupled metrologically to the holding region 31 of the carrier part 30 (FIG. 2), wherein the fastening region 31 fixes the strain relief 20. In this case, the sensor 51 can in particular be formed and configured to detect stresses generated in the holding region 31 based on the exerted line forces.

A strain relief 20 which fixes a plurality of lines 12 is exemplary shown in FIG. 4. The strain relief 20 in this case comprises a plurality of line holding means or line holding elements or line holders 21, a plurality of support regions or support elements 22 and at least one or optionally a plurality of base elements 25. The sensors 51 of the measuring device 50 can each be coupled to a plurality of said elements or regions 21, 22, 25 to receive measured values. This makes it possible to identify individual lines or subgroups of lines which are exposed to higher loads and forces due to the operation of the chain than other lines of the strain relief. Thus, lines for different media, etc. are often held in the chain, for example, lines with different effective cross-section, line structure, etc., which are exposed to different loads and thus different wear during the displacement of the chain. A targeted maintenance of individual lines or line subgroups can take place here based on the measurement results of the sensors 51, which are assigned to individual lines or subgroups of lines.

Figure 5:
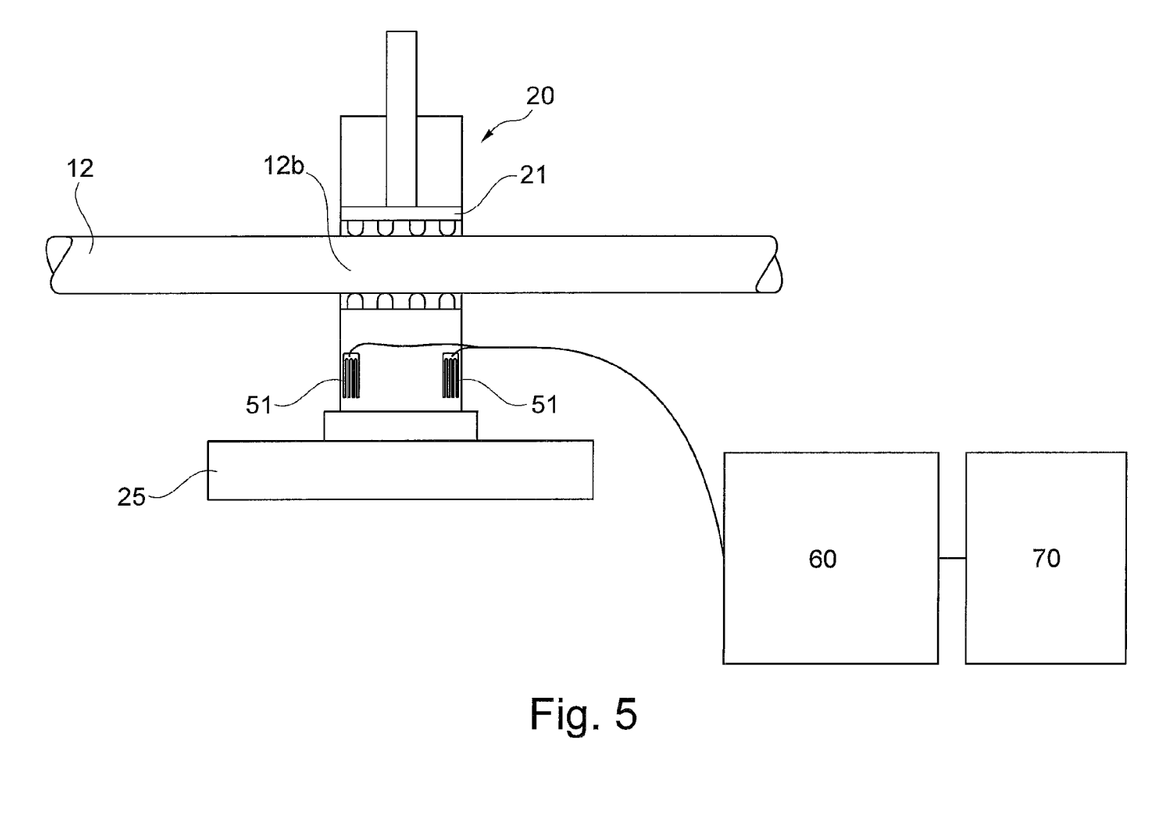
FIG. 5 is a schematic illustration of a further embodiment of a monitoring device according to the invention.

As shown in FIG. 5, the measuring device 50 can comprise at least two sensors 51 or generally two force measuring devices, which are coupled, in a measured-value receiving manner, with different regions of one and the same component in the force transmission direction from the line 12 in the direction of the carrier part 30 in order to measure relative differences in force between two said regions. The calculation of the differences in forces can take place in the evaluation unit 60 connected to the measuring device 50. As shown in FIG. 5, two sensors can be arranged on the support element 22 of the strain relief 20, for example, which sensors are connected to the evaluation device in a signal transmitting manner. The sensors can in particular be formed as strain gauges, other sensors determining a strain can also be provided. The longitudinal extension of the strain gauges is preferably arranged in the direction of the force flow KF. In this way, for example, tensions and bending and/or torsional stresses on the respective component of the strain relief 20 or the strain relief 20 can be determined altogether. Thus, in the case of a force stress such as bending stress, one of the strain gauges can be stretched and the other compressed. In this way, the line forces acting on the strain relief 20 can be measured with very high sensitivity. The component provided with the at least two connected sensors 51 can be a line holder, a support region or base region of the strain relief or the fastening region of the carrier element. Generally, in the context of the invention, support region or base region of the strain relief can be formed as separate components, in particular also separately with respect to the line holders.

If a plurality of sensors of the measuring device is provided, they can be arranged on a common sensor holder with a predefined arrangement of the plurality of sensors relative to each other. The positions of the sensors at the sensor holder can correspond to the nominal positions of the same by the measured value acquisition of said line forces according to the invention. By arranging the sensor holding device in the region of the chain, for example, on the strain relief, the plurality of sensors can be positioned simultaneously in their nominal position for measured value acquisition, which facilitates the assembly or disassembly of the sensors.

The monitoring device 1 further comprises an evaluation device 60 for evaluating the measurement results acquired by the sensors, which can be connected to a signal device 70 in a signal transmitting manner. In the case of undesired states of the lines, for example, when the actual values measured by the sensors 51 are greater or less than the predetermined tolerance range, the signal device 70 sends a monitoring signal to an operator or stops the drive for displacement of the movable connection point.

The evaluation unit 60 is optionally configured to determine deviations of the actual values of the measured values determined by means of the sensors 51 or of the values derived therefrom from predetermined nominal values taking into account predetermined tolerances. The nominal values with tolerances are fixed to ensure proper operation of the lines over a particular period of time, such as a timely fixed maintenance interval.

The evaluation unit 60 is optionally configured to determine temporal changes in the actual values or values derived therefrom over a period of time that can be within a normal maintenance interval, for example, after every 10th or every 100th displacement cycle of the chain. Furthermore, the evaluation unit comprises a computer in order to extrapolate the actual values measured at different times, for example, by a polynomial fitment to the temporal sequence of actual values by means of known mathematical methods. The remaining operating time of the line up to a required maintenance can thus be estimated.

The evaluation unit 60 also stores further operating parameters of the chain, which are measured by other suitable measuring devices, preferably in the same displacement cycle of the chain or at the same time as the measurement of the actual values by the sensors 51. These operating parameters are, according to the embodiment, the displacement speed of the chain and/or the acceleration of the chain in the displacing movement of the chain. These further operating parameters of the chain are displayed and stored together with the measured values of the sensors 51 with respect to the line forces.

With uniform operation of the chain, the forces transmitted by the respective line in the direction of the carrier element are measured by means of the measuring device 50, as described according to the invention. If the actual values, that is, the sensor measured values, exceed the predetermined tolerance range, the evaluation unit 60 transmits a signal for triggering the signal to the signal transmission device 70.

In the case of intended uneven operation of the chain, according to a first variant at the beginning of the maintenance interval, one or more reference cycles are carried out with the chain, and the line forces exerted by the lines are determined by means of the sensors 51 and the operating parameters of the chain are determined and stored as reference values. The reference cycle with a predefined chain displacement is defined here by the two displacement end points V1 and V2 of the chain and the displacement path and chain speed and/or chain acceleration during the displacement path. After a predetermined number of displacement cycles, a reference displacement of the chain is again performed and said values relating to the line forces and chain displacement parameters are determined again. The measured values determined by means of the sensors 51 at the various reference cycles of the chain can then be compared with each other by the evaluation unit and, in the case of deviations outside the tolerance range, a signal can be transmitted to the signal device 70.

According to another variant in uneven chain operation, as described in the first variant, a reference measurement of the line forces takes place with predefined displacement of the chain, or any displacement cycle can be selected as a reference measurement. During the further displacement cycles, the displacement parameters of the chain, such as length and/or direction of displacement path, speeds of chain displacement during a displacement cycle and chain acceleration during a displacement cycle, are then measured and stored in the evaluation unit. This can refer to each individual displacement cycle or a plurality of cycles in a maintenance interval, for example, every 10th cycle. To determine any wear of the lines, which wear is indicated by changing line forces, the measurements of the line forces of different displacement cycles are then compared with each other, in which the chain respectively performs an at least substantially similar displacing movement. It is also possible to run through a plurality of predetermined reference cycles, which in each case differ significantly in relation to the displacement parameters of the chain and can cover the bandwidth of different modes of operation of the chain.

A further variant of the monitoring system 1 consists in that the evaluation unit 60 is configured such as to computationally compare different displacement cycles of the chain with the reference cycle. The operating parameters of the chain determined with a certain displacement of the chain can hereby be converted to the reference values by a predetermined algorithm. The algorithm can be based on assumptions or experiments as to how the line forces change as the operating parameter of the chain changes. If the actual measured value characteristic for the line forces deviates from the expected value of the line forces for the given chain operation parameters, which results from the reference value as an expected value based on the algorithm, then an impermissible deviation exists, which can suggest a line wear. The evaluation unit 60 then outputs a signal to the signal transmission device 70 for outputting an interference signal including a signal for switching off the drive of the movable connection point.

What is claimed is:

1. A monitoring system for operation of an energy chain, which guides at least one line between two connection points being movable relative to one another, comprising:
    an energy chain having two end regions, which are each connectable or connected to one of the connection points, respectively, and which, in a case of relative movement of the connection points, comprises chain sections, which are positionally variable relative to one another or position-changing relative to one another, as guide regions of the at least one line, wherein the at least one line is configured to provide at least one medium and/or energy to a consumer;
    at least one strain relief device having a line holder which is couplable or is coupling to the at least one line;
    a carrier part at at least one of the connection points or being configured to be mounted to at least one of the connection points, wherein the carrier part fixes the at least one strain relief device in stationary manner, by which the at least one line is at an end side fixable or fixed in a strain-relieving manner;
    at least one measuring device to monitor operation of the energy chain; and
    wherein the at least one measuring device is arranged and configured to measure forces
        which are exerted on the at least one line to be fixed by the at least one strain relief device or fixed by the at least one strain relief device during operation of the energy chain, and/or
        which are transmitted by the at least one line to the at least one strain relief device and from the at least one strain relief device further in a direction towards the carrier part.

2. The monitoring system according to claim 1, wherein-the at least one measuring device is arranged in a measurement-effective manner between the at least one line and the carrier part with respect to a direction of a flow of force from the at least one line to be fixed or fixed on the at least one strain relief device into the carrier part, including on the at least one line itself.

3. The monitoring system according to claim 1, wherein the at least one measuring device couples with the at least one strain relief device in a measurement-effective manner.

4. The monitoring system according to claim 3, wherein the at least one measuring device couples to at least one line holder of the at least one strain relief device in a measurement-effective manner.

5. The monitoring system according to claim 3, wherein the at least one strain relief device comprises at least one support region, by which the at least one line holder is fastened to the at least one strain relief device, and in that the at least one measuring device couples to the at least one support region in a measurement-effective manner.

6. The monitoring system according to claim 3, wherein the at least one strain relief device comprises a base element, with which the at least one strain relief device is fixed to the carrier part, and in that the at least one measuring device couples to the base element in a measurement-effective manner.

7. The monitoring system according to claim 1, wherein the at least one strain relief device comprises a base element, with which the at least one strain relief device is fixed to the carrier part, and that the at least one measuring device is coupled with a holding region of the carrier part for the base element in a measurement-effective manner.

8. The monitoring system according to claim 1, wherein the at least one measuring device is formed such that the at least one measuring device is coupled to different regions of one and the same component or component group in a force transmission direction from the at least one line in the direction towards the carrier part to receive measured values, for measuring relative differences in forces which act on both the regions.

9. The monitoring system according to claim 8, wherein the at least one measuring device comprises at least two sensors, which couple to different regions of one and the same component.

10. The monitoring system according to claim 9, wherein each of the at least two sensors, which couple to the different regions of one and the same component, couple with a support region of a strain relief, or with a base element of the strain relief, or with a holding region of the carrier element for the strain relief, to receive measured values.

11. The monitoring system according to claim 1, wherein the at least one measuring device is formed such that the at least one measuring device is coupled with different components in a force transmission direction from the at least one line in the direction towards the carrier part to receive measured values, for measuring relative differences in forces between the two different components.

12. The monitoring system according to claim 1, wherein the at least one strain relief device further comprises a respective strain relief device provided at both connection points, which respectively relieve the at least one line to be fixed in terms of tensile forces relative to the energy chain, and
    wherein the at least one measuring device further comprises two measuring devices, which are arranged and configured to measure forces which are exerted on the at least one line to be fixed or fixed during operation of the energy chain and/or which are transmitted by the at least one line in the direction towards the carrier part.

13. The monitoring system according to claim 1, wherein the system comprises an evaluation unit, by which measured values of the at least one measuring device are acquirable, and that the evaluation unit is configured to compare the measured values of the measuring device with a predetermined threshold value, and in an event of deviations from the predetermined threshold value beyond a predetermined tolerance range, sends a signal to a signal device to trigger the signal device.

14. The monitoring system according to claim 1, wherein the system comprises an evaluation unit which acquires and/or evaluates signals of at least one sensor of the measuring device, wherein the evaluation unit further acquires and/or evaluates signals of a reference sensor.

15. The monitoring system according to claim 14, wherein the evaluation unit triggers a stopping of the relative movement between the connection points in the event of a fault.

16. The monitoring system according to claim 1, wherein the system comprises an evaluation unit, by which measured values of the measuring device are evaluable, and that the energy chain is displaced with a predetermined displacement cycle as a reference cycle and that measured values of a displacement cycle of the chain different from the reference cycle are compared with measured values of the reference cycle.

17. The monitoring system according to claim 1, wherein the at least one measuring device comprises at least one force sensor to measure the forces acting on the at least one line and/or being transmitted therefrom in the direction towards the carrier part.

18. A strain relief device for at least one line guided in an energy chain, comprising:
- a line holder for fixing the at least one line in a strain-relieving manner;
- at least one sensor which is coupled or couplable to a partial region or a component of the strain relief device; and
- wherein the strain relief device is part of a measuring device to measure forces
  - which are exerted on the at least one line to be fixed by the at least one strain relief device or fixed by the at least one strain relief device during operation of the energy chain, and/or
  - which are transmitted during operation of the energy chain by the at least one line in a direction towards the strain relief device.

19. The strain relief device according to claim 18, wherein the measuring device comprises at least one sensor, which is attached between the line holder and a base region of the strain relief device.

20. The strain relief device according to claim 19, wherein the at least one sensor comprises a plurality of sensors, and each sensor of the plurality of sensors comprises a strain gauge.

21. A monitoring system for operation of an energy chain, which guides at least one line between two connection points being movable relative to one another, comprising:
- an energy chain having two end regions, which are each connectable or connected to one of the connection points, respectively, and which, in a case of relative movement of the connection points, comprises chain sections, which are positionally variable relative to one another or position-changing relative to one another, as guide regions of the at least one line;
- at least one strain relief device having a line holder which is couplable or is coupling to the at least one line;
- a carrier part at at least one of the connection points, wherein the carrier part fixes the at least one strain relief device in stationary manner, by which the at least one line is at an end side fixable or fixed in a strain-relieving manner;
- at least one measuring device to monitor operation of the energy chain;
- wherein the at least one measuring device is arranged and configured to measure forces which are exerted on the at least one line to be fixed or fixed during operation of the energy chain and/or which are transmitted by the at least one line in a direction towards the carrier part; and
- wherein the at least one strain relief device comprises a base element, with which the at least one strain relief device is fixed to the carrier part, and that the at least one measuring device is coupled with a holding region of the carrier part for the base element in a measurement-effective manner.

22. A monitoring system for operation of an energy chain, which guides at least one line between two connection points being movable relative to one another, comprising:
- an energy chain having two end regions, which are each connectable or connected to one of the connection points, respectively, and which, in a case of relative movement of the connection points, comprises chain sections, which are positionally variable relative to one another or position-changing relative to one another, as guide regions of the at least one line;
- at least one strain relief device having a line holder which is couplable or is coupling to the at least one line;
- a carrier part at at least one of the connection points, wherein the carrier part fixes the at least one strain relief device in stationary manner, by which the at least one line is at an end side fixable or fixed in a strain-relieving manner;
- at least one measuring device to monitor operation of the energy chain;
- wherein the at least one measuring device is arranged and configured to measure forces which are exerted on the at least one line to be fixed or fixed during operation of the energy chain and/or which are transmitted by the at least one line in a direction towards the carrier part; and
- wherein the system comprises an evaluation unit, by which measured values of the measuring device are evaluable, and that the energy chain is displaced with a predetermined displacement cycle as a reference cycle and that measured values of a displacement cycle of the chain different from the reference cycle are compared with measured values of the reference cycle.

23. A monitoring system for operation of an energy chain, which guides at least one line between two connection points being movable relative to one another, comprising:
- an energy chain having two end regions, which are each connectable or connected to one of the connection points, respectively, and which, in a case of relative movement of the connection points, comprises chain sections, which are positionally variable relative to one another or position-changing relative to one another, as guide regions of the at least one line;
- at least one strain relief device having a line holder which is couplable or is coupling to the at least one line;
- a carrier part at at least one of the connection points, wherein the carrier part fixes the at least one strain relief device in stationary manner, by which the at least one line is at an end side fixable or fixed in a strain-relieving manner;
- at least one measuring device to monitor operation of the energy chain;
- wherein the at least one measuring device is arranged and configured to measure forces which are exerted on the at least one line to be fixed or fixed during operation of the energy chain and/or which are transmitted by the at least one line in a direction towards the carrier part; and
- wherein the at least one measuring device comprises at least one force sensor to measure the forces acting on the at least one line and/or being transmitted therefrom in the direction towards the carrier part.

* * * * *